United States Patent [19]

Higashimura et al.

[11] Patent Number: 4,696,988
[45] Date of Patent: Sep. 29, 1987

[54] PROCESS FOR PREPARATION OF REACTIVE POLYMERS AND POLYMERS PREPARED BY SAID PROCESS

[75] Inventors: Toshinobu Higashimura; Mitsuo Sawamoto, both of Kyoto; Yoshiki Toyoshima, Ehime; Shuuichi Kanagawa, Osaka; Tsutomu Takahashi; Noriaki Saito, both of Ehime, all of Japan

[73] Assignee: Sumitomo Chemical Company, Limited, Osaka, Japan

[21] Appl. No.: 868,386

[22] Filed: May 29, 1986

[30] Foreign Application Priority Data

| May 30, 1985 | [JP] | Japan | 60-117190 |
| Oct. 16, 1985 | [JP] | Japan | 60-230683 |
| Oct. 17, 1985 | [JP] | Japan | 60-233001 |
| Oct. 18, 1985 | [JP] | Japan | 60-234133 |
| Feb. 25, 1986 | [JP] | Japan | 61-040926 |

[51] Int. Cl.$^4$ .................. C08F 2/06; C08F 4/00; C08F 224/00
[52] U.S. Cl. .................. 526/220; 526/238; 526/273
[58] Field of Search .................. 526/273, 237, 238, 220

[56] References Cited

U.S. PATENT DOCUMENTS 4,276,394 6/1981 Kennedy et al. .................. 526/237

FOREIGN PATENT DOCUMENTS 2212499 9/1972 Fed. Rep. of Germany ...... 526/273

Primary Examiner—Peter F. Kulkosky
Attorney, Agent, or Firm—Sughrue, Mion, Zinn, Macpeak and Seas

[57] ABSTRACT

A process for preparing reactive polymers and polymers prepared by the foregoing process are disclosed. This process comprises polymerizing a monomer comprising at least one isopropenylphenyl glycidyl ether represented by formula (1):

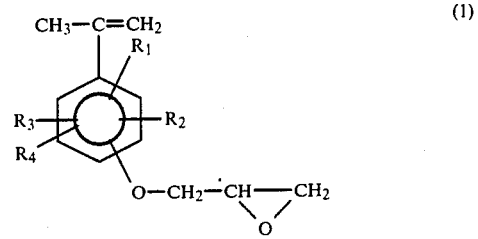

wherein all the symbols are defined in the appended claims, or in combination with at least one other unsaturated monomer, by the use of a catalyst selected from halogens and hydrogen iodide. The reactive polymer prepared by the above process is represented by the general formula (2):

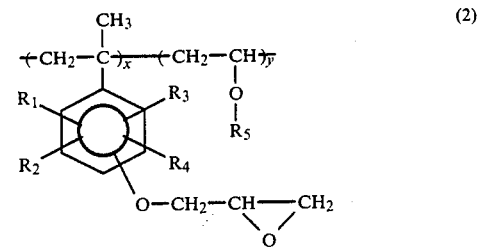

wherein all the symbols are defined in the appended claims, and has a number average molecular weight of 500 to 50,000.

6 Claims, 1 Drawing Figure

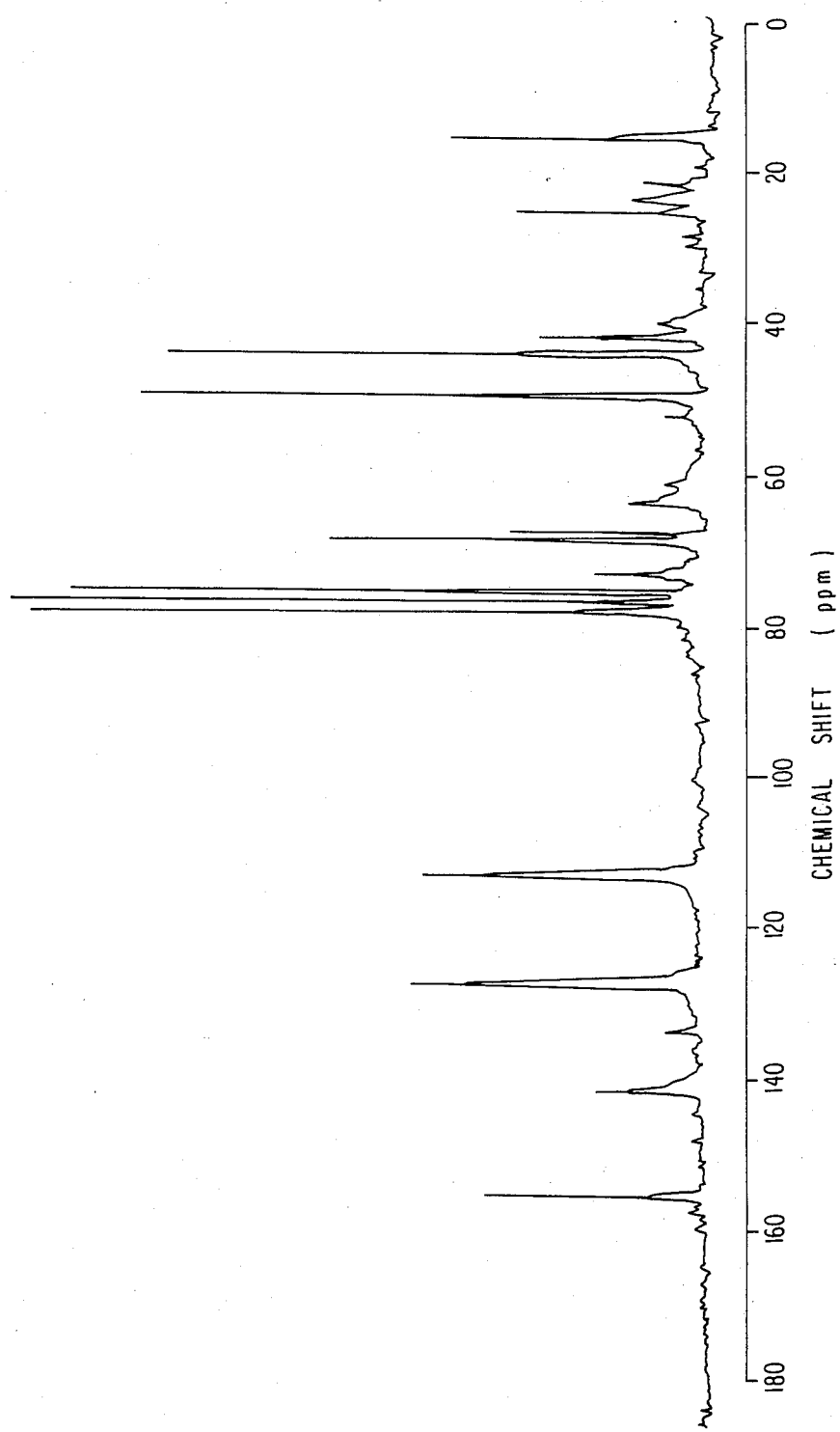

PROCESS FOR PREPARATION OF REACTIVE POLYMERS AND POLYMERS PREPARED BY SAID PROCESS

FIELD OF THE INVENTION

The present invention relates to a process for preparation of glycidyl ether group-containing reactive polymers which are useful as a reactive polymer having an epoxy group in various application fields, such as coating materials, adhesives, resins for FRP (fiber-reinforced plastics), or resin modifiers and also to reactive polymers prepared by said process.

BACKGROUND OF THE INVENTION

Poly(isopropenylphenyl glycidyl ethers) have hitherto been prepared by polymerizing an isopropenylphenol by the use of, e.g., a cation catalyst to form a poly(isopropenylphenol) and then glydidyl etherifying it with epichlorohydrin. In this method, polymers having chlorine groups of various structures resulting from epichlorohydrin, polymers having a

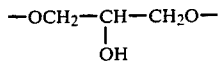

bond (hereinafter referred to "hydroxyether bond") between the molecules thereof, polymers having an unreacted isopropenylphenol portion, and the like are formed as by-products.

A method of preparing poly(vinylphenyl glycidyl ether) by radical polymerizing vinylphenyl glycidyl ether is described in Yuki Gosei Kagaku (Organic Synthetic Chemistry), 26 (12), 66 (1968). However, isopropenylphenyl glycidyl ethers do not undergo radical polymerization probably because of the presence of an α-methyl substituent.

It has heretofore been considered that vinyl polymerization-type poly(isopropenylphenyl glycidyl ethers) having an epoxy group are difficult to prepare by conventional ion polymerization methods because not only the isopropenyl group but also the glycidyl group undergo polymerization.

Poly(isopropenylphenyl glycidyl ethers) are known as a heat-resistant epoxy resin. Heat-resistant epoxy resins which are now commercially available are a glycidyl ether of phenol novolak, a glycidyl ether of o-cresol novolak, and the like. But, since poly(isopropenylphenyl glycidyl ethers) have a higher glass transition temperature than that the above-described epoxy resins, it is expected that the former can be applied in more various fields.

From isopropenylphenyl glycidyl ethers, unlike novolak-type glycidyl ethers, it is possible to prepare compounds having new properties by copolymerizing with other monomers because the isopropenylphenyl glycidyl ethers are a vinyl polymerization-type monomer. It is known as described in working examples of Japanese Patent Application (OPI) No. 90234/79 (the term "OPI" as used herein means a "published unexamined patent application") that isopropenylphenyl glycidyl ethers can be copolymerized with monomers such as methyl methacrylate, styrene, and acrylonitrile.

In a method of preparing poly(isopropenylphenyl glycidyl ethers) by glycidyl etherifying a poly(isopropenylphenol) with epichlorohydrin, in addition to the desired product, polymers having chlorine groups of various structures resulting from the epichlorohydrin, polymers having a hydroxyether bond as a result of intermolecular reaction, polymers having an unreacted isopropenylphenol portion, and the like are formed as by-products.

When a poly(isopropenylphenyl glycidyl ether) containing the above-described by-products is used as an epoxy resin, corrosion due to hydrolyzable chlorine occurs particularly in the application of electronic materials and, thus, it is unsuitable for practical use. If polymers having a hydroxyether bond are present, when the poly(isopropenylphenyl glycidyl ether) is cured, the crosslinking density is decreased, leading to a decrease in heat resistance of the resulting resin. Moreover, if a hydroxyl group is present, it exerts adverse influences such as a decrease in water resistance.

SUMMARY OF THE INVENTION

A first object of the present invention is to provide an advantageous process for the preparation of poly(isopropenylphenyl glycidyl ethers) in which components causing the above-described defects and problems are less.

Isopropenylphenyl glycidyl ethers and alkyl vinyl ethers cannot be copolymerized with each other in the presence of a radical initiator.

On the other hand, when an ion catalyst is used, not only an isopropenyl group but also an epoxy group of the isopropenylphenyl glycidyl ether are polymerized. Thus copolymers of vinyl polymerization-type isopropenylphenyl glycidyl ethers and alkyl vinyl ethers have not yet been obtained.

A second object of the present invention is to provide copolymers of isopropenylphenyl glycidyl ethers and alkyl vinyl ethers, which are useful as coating materials, adhesives, resins for FRP, modifiers for resins, and so forth.

BRIEF DESCRIPTION OF THE ACCOMPANYING DRAWING

The FIGURE is a $^{13}$C-NMR chart of the copolymer of p-isopropenylphenyl glycidyl ether and ethyl vinyl ether obtained in Example 15.

DETAILED DESCRIPTION OF THE INVENTION

In one embodiment, the present invention relates to a process for preparing a reactive polymer, which comprises polymerizing a monomer comprising at least one isopropenylphenyl glycidyl ether represented by formula (1) shown below alone or in combination with other unsaturated monomer, by the use of at least one catalyst selected from halogens and hydrogen iodide.

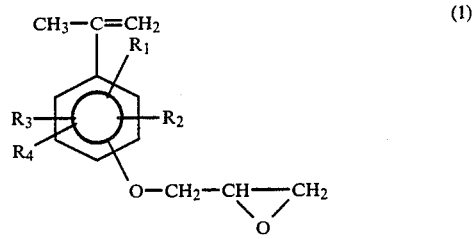

In formula (1), $R_1$, $R_2$, $R_3$, and $R_4$ are each a hydrogen atom, a halogen atom, an alkyl group having from 1 to 4 carbon atoms, or a phenyl group.

Isopropenylphenyl glycidyl ethers which are represented by formula (1) in the present invention include o-isopropenylphenyl glycidyl ether, m-isopropenylphenyl glycidyl ether, p-isopropenylphenyl glycidyl ether, 2,6-dimethyl-4-isopropenylphenyl glycidyl ether, 2,6-dibromo-4-isopropenylphenyl glycidyl ether, 2-phenyl-4-isopropenylphenyl glycidyl ether, and the like. Of these compounds, o-, m-, and p-isopropenylphenyl glycidyl ethers are commercially easily available.

These isopropenylphenyl glycidyl ethers can be prepared by reacting an isopropenylphenol and epichlorohydrin. For this reaction, methods commonly used in the preparation of glycidyl ethers of mono- or polyhydric phenols can be employed.

Though the isopropenylphenyl glycidyl ethers prepared by the above methods can be used as they stand, when they are used as a starting material for the preparation of epoxy resins, it is preferred that the amount of impurities contained therein be decreased.

The isopropenylphenyl glycidyl ethers prepared from an isopropenylphenol and epichlorohydrin can be purified by known purification or recrystallization techniques.

This purification permits to remove oligomer components and chlorine-containing derivatives resulting from the reaction of the isopropenylphenol and epichlorohydrin to an optional extent.

When the polymer is used as an epoxy resin for electronic materials, it is preferred that the purity of the isopropenylphenyl glycidyl ether be 98.7 wt% or more and the purity of chlorine-containing derivatives of isopropenylphenyl be 0.8 wt% or less.

As the purity of the isopropenylphenyl glycidyl ether is higher, the polymer is higher in heat resistance and water resistance when used as an epoxy resin, and as the amount of the chlorine-containing derivatives of isopropenylphenyl is lower, the content of hydrolyzable chlorine is preferably smaller.

The other unsaturated monomer which is another monomer is a cation polymerizable compound having at least one carbon-carbon double bond. Examples are styrenes such as α-methylstyrene, methoxystyrene, and vinyltoluene; vinyl ethers such as methyl vinyl ether, ethyl vinyl ether, isobutyl vinyl ether, n-butyl vinyl ether, 2-ethylhexyl vinyl ether, 2-chloroethyl vinyl ether, 2-acetoxyethyl vinyl ether, and 2-benzoyloxyethyl vinyl ether; conjugated dienes such as butadiene, isoprene, and cyclopentadiene; cyclic unsaturated compounds such as indene; and aliphatic olefins such as isobutylene.

The isopropenylphenyl glycidyl ether can be used alone or in admixture of two or more thereof. Furthermore, the type of the isopropenylphenyl glycidyl ether as a monomer and the ratio thereof to the other unsaturated monomer can be determined appropriately depending on the purpose of use of the polymer to be prepared.

The catalyst used for the polymerization of the present invention is at least one member selected from halogens and hydrogen iodide. Examples of halogens include iodine, bromine, iodine bromide, and iodine chloride. Preferred catalysts are iodine, hydrogen iodide, and a mixture thereof, with a mixture of iodine and hydrogen iodide being particularly preferred. A suitable iodine/hydrogen iodide molar ratio is from 0.1/1 to 4/1.

A suitable amount of the catalyst used is from 0.0001 to 0.1 mol per mol of the total monomer. The molecular weight of the polymer to be prepared can be controlled depending upon the amount of the catalyst used. Since the molecular weight of the polymer varies also with the type of the monomer and the composition, it suffices that the relation between the molecular weight and the amount of the catalyst is determined by preliminary experiments.

In the polymerization, solvents which are commonly used in cation polymerization can be used. Examples are aromatic hydrocarbons, halogenated hydrocarbons, and nitrohydrocarbons. Specific examples include benzene, toluene, dichloromethane, 1,2-dichloroethane, and nitroethane.

The polymerization temperature is preferably from $-100°$ C. to 30° C. and more preferably from $-80°$ C. to 0° C. If the polymerization temperature is in excess of 30° C., the polymerization yield undesirably drops. On the other hand, even if the polymerization temperature is below $-100°$ C., the effect is small and, thus, such is disadvantageous from an industrial standpoint and is not preferred.

In another embodiment, the present invention relates to a reactive polymer comprising a copolymer of an isopropenylphenyl glycidyl ether represented by formula (2) shown below and an alkyl vinyl ether, the reactive polymer having a number average molecular weight of from 500 to 50,000.

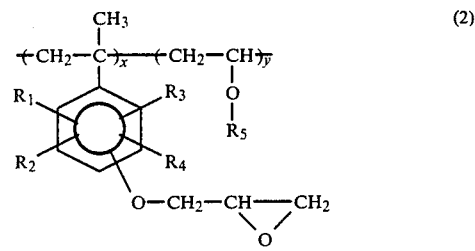

(2)

In formula (2), $R_1$, $R_2$, $R_3$, and $R_4$ are each a hydrogen atom, a halogen atom, an alkyl group having from 1 to 4 carbon atoms, or a phenyl group; $R_5$ is an alkyl group having from 1 to 8 carbon atoms or a halogen- or acyloxy-substituted group thereof; and the ratio of x/y is from 1/99 to 99/1.

Representative examples of the substituents $R_1$ to $R_4$ are a hydrogen atom, a chlorine atom, a bromine atom, a methyl group, a tert-butyl group, and a phenyl group.

Representative examples of the substituent $R_5$ are a methyl group, an ethyl group, an isobutyl group, an n-butyl group, a 2-ethylhexyl group, a 2-chloroethyl group, a 2-acetoxyethyl group, and a 2-benzoyloxyethyl group.

This reactive polymer can be prepared by copolymerizing isopropenylphenyl glycidyl ethers and alkyl vinyl ethers as monomers by the use of at least one catalyst selected from halogens and hydrogen iodide.

Representative examples of the isopropenylphenyl glycidyl ethers and alkyl vinyl ethers are those as described above.

The ratio of the isopropenylphenyl glycidyl ether unit to the alkyl vinyl ether unit in the reactive polymer can be determined within the range of from 1/99 to 99/1 depending on the use of the resulting polymer. The number average molecular weight of the reactive polymer can be appropriately chosen within the range of from 500 to 50,000. If the number average molecular weight is less 500, the viscosity is too low. On the other hand, if the number average molecular weight exceeds 50,000, the viscosity is so high that the polymer is undesirably difficult to handle. As described above, the molecular weight varies with the ratio of the monomer units and can be adjusted by controlling the amount of the catalyst used.

The polymer disclosed in the present invention and the polymer prepared by the method of the present invention can be cured by adding curing agents as in conventional epoxy resins, and can be used in the same applications as in the conventional epoxy resins.

As the curing agent, known curing agents can be used. Examples are amine-type curing agents such as amines and polyamides; acid-type curing agents such as acid anhydrides; polyphenol-type curing agents such as phenol novolak, polyvinylphenol, and polyisopropenylphenol; and Lewis acid-type curing agents such as a boron trifluoride complex.

The polymer of the present invention can be used as paints, semi-conductor encapsulating materials, adhesives, resins for FRP such as print substrates, resin modifiers, and so forth.

In one embodiment, the present invention provides a method in which substances having two functional groups in the molecule, such as isopropenylphenyl glycidyl ethers having an isopropenyl group and a glycidyl group in the molecule, are polymerized in the presence of a specified catalyst, whereby only the isopropenyl group is polymerized while preventing the polymerization of the glycidyl group.

Heretofore, such vinyl polymerization-type isopropenylphenyl glycidyl ethers have been obtained only by reacting a poly(isopropenylphenol) and epichlorohydrin. In this method, even if chlorinated products resulting from epichlorohydrin are present, it is difficult to remove them.

On the other hand, in the present invention, since the isopropenylphenyl glycidyl ether can be purified by commonly used techniques such as distillation and recrystallization, there can be obtained poly(isopropenylphenyl glycidyl ethers) in which the content of impurities is adjusted to an optional level.

When this resin is used as a starting material for electronic materials, it is preferred that the content of impurities be smaller.

The glycidyl ether-based reactive polymer of the present invention is a copolymer of an isopropenylphenyl glycidyl ether and an alkyl vinyl ether having a wide range of the composition thereof and has an epoxy group in the molecule thereof and, therefore, it can find various applications such as film-forming materials and resin modifies as in conventional epoxy resins.

For example, if the content of the isopropenylphenyl glycidyl ether portion is large, not only the resulting resin keeps high heat resistance which epoxy resins formed from an isopropenyl glycidyl ether as a starting material inherently have but also, because of the presence of the alkyl vinyl ether portion, the resin is expected to be a resin which is less in cracking because the alkyl vinyl ether portion has an effect of absorbing an internal stress generated during the curing. Moreover, if the content of the alkyl vinyl ether portion is large, the resulting resin is a·rubber-like substance and can be used for a flexibility-imparting agent as a rubber having a reactive group by, for example, adding to conventional epoxy resin compositions.

The present invention is described below in greater detail with reference to the following examples.

The term "epoxy equivalent" as used herein means a number of grams of the polymer's weight per mol of the glycidyl ether group.

The chlorine content is defined as a weight percentage of the chlorine atom measured by dissolving a poly(isopropenylphenyl glycidyl ether) in dioxane, adding thereto an alcoholic solution of potassium hydroxide, heating the resulting mixture under reflux for 2 hours, and subjecting the chlorine ion released to back titration for quantitative determination using a silver nitrate solution.

The number average molecular weight was measured by a vapor pressure-osmotic pressure method (a molecular weight determination apparatus Model 117, produced by Corona Co., Ltd.). The presence of the ring-opening bond of the glycidyl group in the polymer was measured by an absorption at 1,110 cm$^{-1}$ by infrared spectral analysis.

The structural analysis of the polymer was performed by the $^{13}$C-NMR spectrometry (FT-NMR, R-90H, produced by Hitachi, Ltd.) using deutorium-substituted chloroform as a solvent.

The copolymerization ratio of the isopropenylphenyl glycidyl ether to the other monomer was calculated from the epoxy equivalent value.

REFERENCE EXAMPLE 1

(1) Preparation of Crude p-Isopropenylphenyl Glycidyl Ether:

134 g of p-isopropenylphenol (containing 12.5 wt% of oligomers) and 7.0 mol of epichlorohydrin were placed in a one-liter flask equipped with a thermometer, a separatory tube, a dropping funnel, and a stirrer to prepare a uniform solution. A 48 wt% aqueous solution of NaOH was continuously added thereto over 6 hours while maintaining the temperature at 74° C. and the pressure at 250 mmHg. During this process, the epichlorohydrin and water were subject to azeotropy and liquefied in the separatory tube where the mixture was separated into an organic layer and an aqueous layer. The aqueous layer was taken out of the system, and the organic layer was recycled to the system. After completion of the reaction, the reaction mixture was maintained at that temperature for one hour to evaporate off the unreacted epichlorohydrin, and the reaction product was dissolved in methyl isobutyl ketone.

The salts formed as by-products were removed by filtration, and the methyl isobutyl ketone was removed by evaporation to obtain crystals which were solid at room temperature. The epoxy equivalent and the chlorine content of the product were 201 and 830 ppm, respectively.

Analyses with GC-Mass (a gas chromatographic mass analyzer DX-800, produced by Japan Electron Optics Laboratory Co., Ltd.) and GPC (a gel permeation chromatography, TRIROTAR-SR$_2$, produced by Japan Spectroscopic Co., Ltd.) showed that the product contained 80.95 wt% of p-isopropenylphenyl glycidyl ether, 14.7 wt% of p-isopropenylphenyl glycidyl ether oligomers, and 0.42 wt% of a chlorine-containing derivative of p-isopropenylphenyl.

(2) Purification of p-Isopropenylphenyl Glycidyl Ether:

100 g of the crude p-isopropenylphenyl glycidyl ether obtained in (1) above was separated in a purification column having a number of theoretical plate of 10 to about 67 g of a fraction of from 120° to 122° C. at 1.8 Torr. On allowing this fraction to stand at room temperature, white crystals were formed. For this product, the epoxy equivalent was 190, and the chlorine content was 30 ppm. The gas chromatographic analysis showed that the purity of p-isopropenylphenyl glycidyl ether was 99.95 wt% and the content of the chlorine-containing derivative of p-isopropenylphenyl was 0.01 wt%.

REFERENCE EXAMPLE 2

(1) Preparation of Crude m-Isopropenylphenyl Glycidyl Ether:

A viscous liquid was obtained in the same manner as in Reference Example 1-(1) except that 134 g of m-isopropenylphenyl glycidyl ether (containing 53 wt% of oligomers) was used in place of 134 g of p-isopropenylphenyl glycidyl ether. This liquid had an epoxy equivalent of 209 and a chlorine content of 850 ppm and had the following composition: 42.3 wt% of m-isopropenylphenyl glycidyl ether, 56 wt% of m-isopropenylphenyl glycidyl ether oligomers, and 0.53 wt% of chlorine-containing derivative of m-isopropenylphenyl.

(2) Purification of m-Isopropenylphenyl Glycidyl Ether:

100 g of the crude m-isopropenylphenyl glycidyl ether obtained in (1) above was purified in the same manner as in Reference Example 1-(2). The thus purified product had an epoxy equivalent of 190 and a chlorine content of 60 ppm. The gas chromatographic analysis showed that the purity of m-isopropenylphenyl glycidyl ether was 99.3 wt% and the content of the chlorine-containing derivative of m-isopropenylphenyl was 0.03 wt.

REFERENCE EXAMPLE 3

(1) Preparation of o-Isopropenylphenyl Glycidyl Ether:

A viscous liquid was obtained in the same manner as in Reference Example 1-(1) except that 134 g of o-isopropenylphenyl glycidyl ether (containing 63 wt% of o-isopropenylphenyl glycidyl ether oligomers) was used in place of 134 g of p-isopropenylphenyl glycidyl ether. This liquid had an epoxy equivalent of 221 and a chlorine content of 790 ppm and had the following composition: 29.4 wt% of o-isopropenylphenyl glycidyl ether, 69.3 wt% of o-isopropenylphenyl glycidyl ether oligomers, and 0.51 wt% of chlorine-containing derivative of o-isopropenylphenyl.

(2) Purification of o-Isopropenylphenyl Glycidyl Ether:

100 g of the crude o-isopropenylphenyl glycidyl ether obtained in (1) above was purified in the same manner as in Reference Example 1-(2). The thus purified product had an epoxy equivalent of 191 and a chlorine content of 90 ppm. The gas chromatographic analysis showed that the purity of the o-isopropenylphenyl glycidyl ether was 99.1 wt% and the content of the chlorine-containing derivative of o-isopropenylphenyl was 0.05 wt%.

EXAMPLES 1 TO 14

In a four-necked flask, monomers as shown in Table 1 were dissolved in 233.8 g of methylene chloride which had been dehydrated with Molecular Sieves 4A, and the solution was cooled to $-10°$ C. A catalyst as shown in Table 1 was added thereto, and the monomers were reacted for one hour. Then 50 g of methanol was added to stop the reaction. The reaction mixture was washed with 100 g of a 10 wt% aqueous solution of sodium thiosulfate and further with 100 g of purified water, and the solvent and remaining monomers were then removed by distillation to obtain a polymer. The results are shown in Table 1.

All the polymers thus prepared were soluble in tetrahydrofuran, and the open-ring bond of the glycidyl group cannot be detected by infrared spectral analysis. The $^{13}$C-NMR analysis confirmed that a vinyl polymerization-type copolymer was formed.

COMPARATIVE EXAMPLES 1 AND 2

Polymerization was conducted using the monomers and catalyst shown in Table 1 in the same manner as in Examples 1 to 14. The polymers thus obtained were insoluble in tetrahydrofuran, and the open-ring bond of the glycidyl group can be detected by the infrared spectral analysis.

COMPARATIVE EXAMPLE 3

Poly(p-isopropenylphenol) (number average molecular weight: 1,000) was glycidyl etherified in the same manner as in Reference Example 1-(1). The resin thus obtained had an epoxy equivalent of 203 and a chlorine content of 860 ppm.

TABLE 1

| | Monomer*[1] 1 | Monomer 2 | Catalyst | Yield (g) | Chlorine Content (g) | Epoxy Equivalent | Number Average Molecular Weight | Mol Composition of Polymer (Monomer 1/ Monomer 2) |
|---|---|---|---|---|---|---|---|---|
| Example 1 | p-IPGE (19.0 g) | — | Iodine (0.254 g) | 11.3 | 30 | 201 | 7,300 | — |
| Example 2 | p-IPGE (19.0 g) | — | Hydrogen iodide (0.128 g) | 6.0 | 30 | 197 | 1,000 | — |
| Example 3 | p-IPGE (19.0 g) | — | Hydrogen iodide (0.12 g) Iodine (0.254 g) | 18.7 | 30 | 195 | 4,600 | — |
| Example 4 | p-IPGE (19.0 g) | — | Hydrogen iodide (0.128 g) Iodine chloride (0.163 g) | 11.7 | 20 | 200 | 6,900 | — |
| Example 5 | m-IPGE (19.0 g) | — | Iodine (0.254 g) | 7.6 | 50 | 204 | 6,100 | — |
| Example 6 | m-IPGE (19.0 g) | — | Hydrogen iodide (0.128 g) Iodine (0.254 g) | 6.7 | 70 | 197 | 3,500 | — |

TABLE 1-continued

| | Monomer*1 1 | Monomer 2 | Catalyst | Yield (g) | Chlorine Content (g) | Epoxy Equivalent | Number Average Molecular Weight | Mol Composition of Polymer (Monomer 1/ Monomer 2) |
|---|---|---|---|---|---|---|---|---|
| Example 7 | o-IPGE (19.0 g) | — | Iodine (0.254 g) | 8.2 | 90 | 203 | 5,900 | — |
| Example 8 | o-IPGE (19.0 g) | — | Hydrogen iodide (0.128 g) Iodine (0.254 g) | 7.3 | 90 | 199 | 4,300 | — |
| Example 9 | p-IPGE (9.5 g) | m-IPGE (9.5 g) | Iodine (0.254 g) | 6.5 | 40 | 201 | 7,000 | 0.70/0.30 |
| Example 10 | p-IPGE (15.2 g) | Ethyl vinyl ether (1.44 g) | Hydrogen iodide (0.128 g) Iodine (0.254 g) | 15.8 | 10 | 227 | 7,200 | 0.66/0.34 |
| Example 11 | p-IPGE (9.5 g) | Ethyl vinyl ether (3.6 g) | Hydrogen iodide (0.128 g) Iodine (0.254 g) | 11.7 | 30 | 323 | 6,700 | 0.35/0.65 |
| Example 12 | p-IPGE (3.8 g) | Ethyl vinyl ether (5.7 g) | Hydrogen iodide (0.128 g) Iodine (0.254 g) | 4.7 | 10 | 670 | 4,700 | 0.13/0.87 |
| Example 13 | p-IPGE (9.5 g) | Ethyl vinyl ether (3.6 g) | Hydrogen iodide (0.128 g) Iodine (0.254 g) | 9.5 | 40 | 430 | 3,700 | 0.23/0.77 |
| Example 14 | p-IPGE (9.5 g) | α-Methyl-styrene (5.9 g) | Hydrogen iodide (0.128 g) Iodine (0.254 g) | 12.3 | 20 | 308 | 6,900 | 0.50/0.50 |
| Comparative Example 1 | p-IPGE (19.0 g) | — | Ethyl ether boron tri-fluoride complex (0.14 g) | 2.7 | — | — | — | — |
| Comparative Example 2 | p-IPGE (19.0) | — | Trifuloro-methane-sulfonic acid (0.15 g) | 1.5 | — | — | — | — |

*1IPGE = isopropenylphenyl glycidyl ether

EXAMPLES 15 TO 22

The same procedures as in Examples 1 to 14 were repeated except that isopropenylphenyl glycidyl ethers, vinyl ethers, and catalysts as shown in Table 2 were used. The results are shown in Table 2.

All the resins thus obtained were soluble in tetrahydrofuran. A $^{13}$C-NMR chart of the resin obtained in Example 15 is shown in the FIGURE. Peaks ascribable to the glycidyl group are observed at 68.0, 49.2 and 44.6 (ppm), and peaks ascribable to the ethoxy group, at 63.5 and 15.0 (ppm).

The composition of the copolymer was quantitatively determined based on the absorption of the aromatic ring at 1,600 cm$^{-1}$ in the infrared absorption spectrum. This value is in good agreement with the one as calculated from the epoxy equivalent of the copolymer.

TABLE 2

| Example No. | Monomer 1 | Monomer 2 | Catalyst and its Amount | Temperature × Time | Yield (g) | External Appearance of Resin | Number Average Molecular Weight | Epoxy Equivalent | Composition of Copolymer IPGE/VE*2 |
|---|---|---|---|---|---|---|---|---|---|
| 15 | p-IPGE (19.0 g) | Ethyl vinyl ether (7.2 g) | Hydrogen iodide (0.128 g) | −10° C. × 1 hr | 18 | Pale yellow resin-like | 1,200 | 330 | 0.34/0.66 |
| 16 | p-IPGE (19.0 g) | Ethyl vinyl ether (7.2 g) | Hydrogen iodide (0.128 g) Iodine (0.254 g) | " | 23 | Pale yellow resin-like | 6,700 | 323 | 0.39/0.61 |
| 17 | p-IPGE (30.4 g) | Ethyl vinyl ether (2.88 g) | Hydrogen iodide (0.128 g) Iodine (0.254 g) | " | 32 | Pale yellow resin-like | 7,200 | 227 | 0.70/0.30 |
| 18 | p-IPGE | Ethyl vinyl | Hydrogen | " | 9.3 | Pale yellow | 4,700 | 670 | 0.11/0.89 |

TABLE 2-continued

| Example No. | Monomer 1 | Monomer 2 | Catalyst and its Amount | Temperature × Time | Yield (g) | External Appearance of Resin | Number Average Molecular Weight | Epoxy Equivalent | Composition of Copolymer IPGE/VE*[2] |
|---|---|---|---|---|---|---|---|---|---|
|  | (7.6 g) | ether (11.52 g) | iodide (0.128 g) Iodine (0.254 g) |  |  | resin-like |  |  |  |
| 19 | m-IPGE (19.0 g) | Ethyl vinyl ether (7.2 g) | Hydrogen iodide (0.128 g) Iodine (0.254 g) | " | 19 | Yellow resin-like | 3,700 | 4300 | 0.23/0.77 |
| 20 | m-IPGE (30.4 g) | Ethyl vinyl ether (2.88 g) | Hydrogen iodide (0.128 g) Iodine (0.254 g) | " | 24 | Pale yellow resin-like | 4,400 | 281 | 0.40/0.60 |
| 21 | p-IPGE (19.0) | n-Butyl vinyl ether (9.9 g) | Hydrogen iodide (0.128 g) Iodine (0.254 g) | " | 27 | Pale yellow resin-like | 7,900 | 342 | 0.41/0.59 |
| 22 | m-IPGE (19.0 g) | n-Butyl vinyl ether (9.9 g) | Hydrogen iodide (0.128 g) Iodine (0.254 g) | " | 21 | Yellow resin-like | 5,100 | 475 | 0.22/0.78 |

*[2]VE = alkylvinyl ether

While the invention has been described in detail and with reference to specific embodiments thereof, it will be apparent to one skilled in the art that various changes and modifications can be made therein without departing from the spirit and scope thereof.

What is claimed is:

1. A process for preparing a reactive polymer having a molecular weight of from 500 to 50,000 by polymerizing a monomer comprising at least one isopropenylphenyl glycidyl ether represented by formula

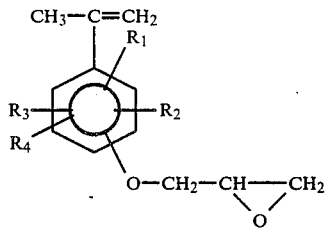

(1)

wherein $R_1$, $R_2$, $R_3$ and $R_4$ are each a hydrogen atom, a halogen atom, an alkyl group having from 1 to 4 carbon atoms, or a phenyl group, or in combination with other cation polymerizable unsaturated monomer to provide a reactive polymer of at least one unit of monomer comprising formula (1) to 99 units of said unsaturated monomer by the use of at least one catalyst selected from halogens and hydrogen iodide in an amount of from 0.0001 to 0.1 mol per mol of the total monomer at a temperature ranging from −100° C. to 30° C. in the presence of at least one solvent selected from aromatic hydrocarbons, halogenated hydrocarbons and nitrohydrocarbons.

2. A process as claimed in claim 1, wherein said isopropenylphenyl glycidyl ether represented by formula (1) is o-isopropenylphenyl glycidyl ether, m-isopropenylphenyl glycidyl ether, or p-isopropenylphenyl glycidyl ether.

3. A process as claimed in claim 1, wherein said monomer is a mixture of two or more compounds selected from o-isopropenylphenyl glycidyl ether, m-isopropenylphenyl glycidyl ether, and p-isopropenylphenyl glycidyl ether.

4. A process as claimed in claim 1, wherein said monomer is a mixture of at least one isopropenylphenyl glycidyl ether represented by formula (1) and at least one copolymerizable other unsaturated monomer.

5. A process as claimed in claim 1, wherein said catalyst is at least one compound selected from iodine and hydrogen iodide.

6. A glycidyl ether group-containing reactive polymer having a number average molecular weight of from 500 to 50,000, represented by formula (2):

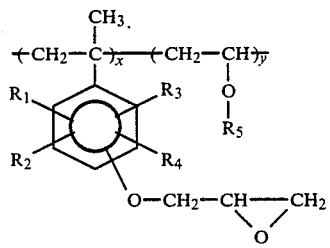

(2)

wherein $R_1$, $R_2$, $R_3$ and $R_4$ are each a hydrogen atom, a halogen atom, an alkyl group having from 1 to 4 carbon atoms, or a phenyl group; $R_5$ is an alkyl group having from 1 to 8 carbon atoms or a halogen- or acyloxy-substituted group thereof; and the ratio of x/y is from 1/99 to 99/1.

* * * * *